United States Patent [19]

Hamilton et al.

[11] Patent Number: 4,774,211
[45] Date of Patent: Sep. 27, 1988

[54] METHODS FOR PREDICTING AND CONTROLLING THE SHRINKAGE OF CERAMIC OXIDES DURING SINTERING

[75] Inventors: Kenneth J. Hamilton, San Jose, Calif.; Jimmie L. Powell, Wappingers Falls, N.Y.

[73] Assignee: International Business Machines Corporation, Armonk, N.Y.

[21] Appl. No.: 135,551

[22] Filed: Dec. 14, 1987

Related U.S. Application Data

[63] Continuation of Ser. No. 851,019, Apr. 14, 1986, abandoned, which is a continuation of Ser. No. 521,463, Aug. 8, 1983, abandoned.

[51] Int. Cl.$^4$ .............................................. C04B 35/10
[52] U.S. Cl. ...................... 501/153; 501/32; 501/127; 501/128; 264/63; 264/212
[58] Field of Search ................. 501/128, 127, 153, 32; 264/63, 212

[56] References Cited

U.S. PATENT DOCUMENTS

| | | | |
|---|---|---|---|
| 3,491,491 | 1/1970 | Ueltz | 501/153 |
| 3,549,473 | 12/1970 | LeBlanc et al. | 524/430 |
| 3,698,923 | 10/1972 | Stetson et al. | 501/153 X |
| 3,740,243 | 6/1973 | Kappes et al. | 501/127 OR |
| 3,780,150 | 12/1973 | Stetson et al. | 501/153 X |
| 3,880,971 | 4/1975 | Pantanelli | 501/127 X |
| 4,083,919 | 4/1978 | Pearlman | 501/153 |
| 4,151,235 | 4/1979 | May et al. | 501/153 |
| 4,153,491 | 5/1979 | Swiss et al. | 264/63 X |
| 4,159,295 | 6/1979 | Mazzuchelli et al. | 264/63 OR |
| 4,250,224 | 2/1981 | Newitzki | 524/430 |
| 4,318,995 | 3/1982 | Rhodes et al. | 501/153 |
| 4,353,958 | 10/1982 | Kita et al. | 264/63 X |
| 4,587,068 | 5/1986 | Borase et al. | 264/63 OR |

Primary Examiner—Mark L. Bell
Assistant Examiner—Karl Group
Attorney, Agent, or Firm—Sughrue, Mion, Zinn, Macpeak, and Seas

[57] ABSTRACT

A method of predicting the fired shrinkage of a ceramic oxide slurry which comprises measuring the ionic impurity concentration in the ceramic oxide slurry. A ceramic oxide slurry which exhibits a predetermined fired shrinkage can be formulated by the step of adding a predetermined amount of at least one ionic dopant to the ceramic oxide slurry in another embodiment.

18 Claims, 5 Drawing Sheets

IMPURITY CONCENTRATIONS vs. (X-Y) SHRINKAGE.

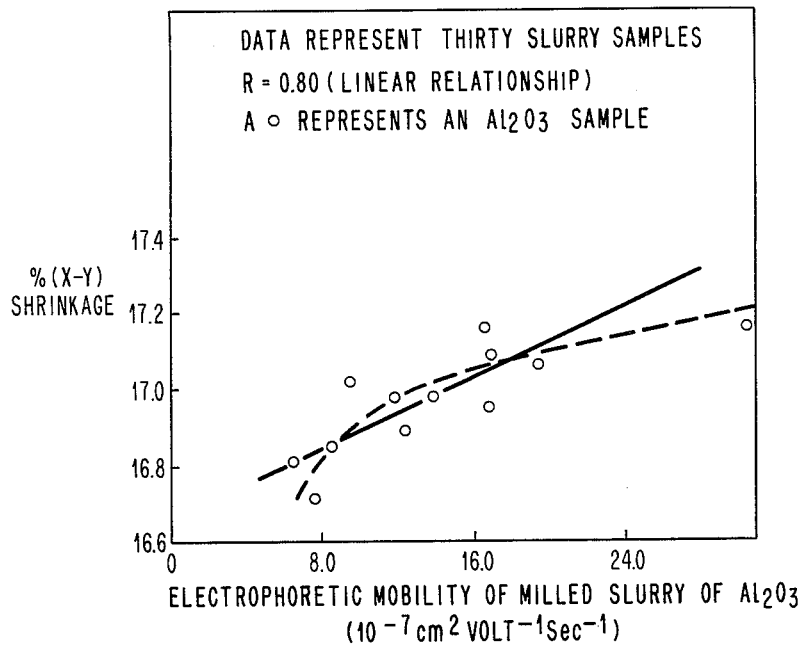
FIG. 1 ELECTROPHORETIC MOBILITY vs. %(X-Y) SHRINKAGE.
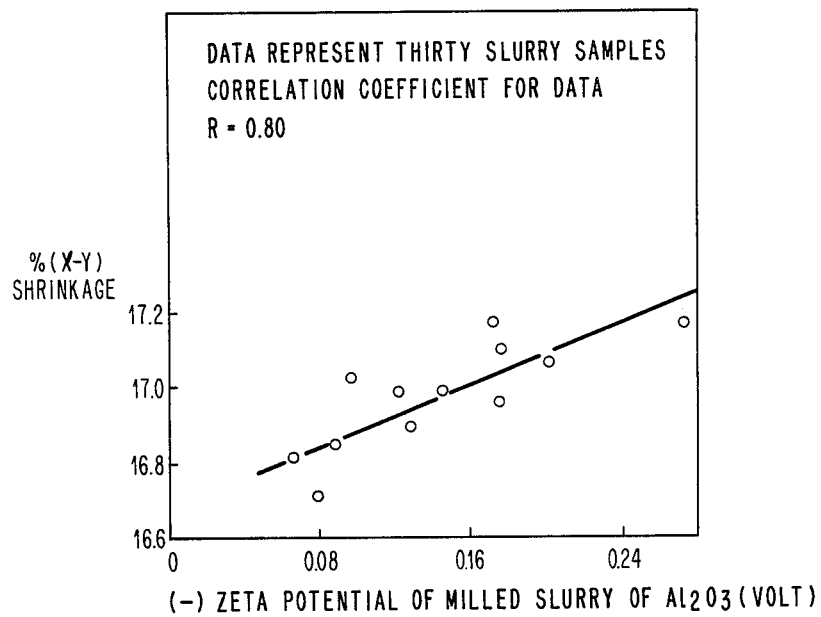
FIG. 2 ZETA POTENTIAL vs. %(X-Y) SHRINKAGE.

SLURRY RESISTIVITY vs. %(X-Y) SHRINKAGE.

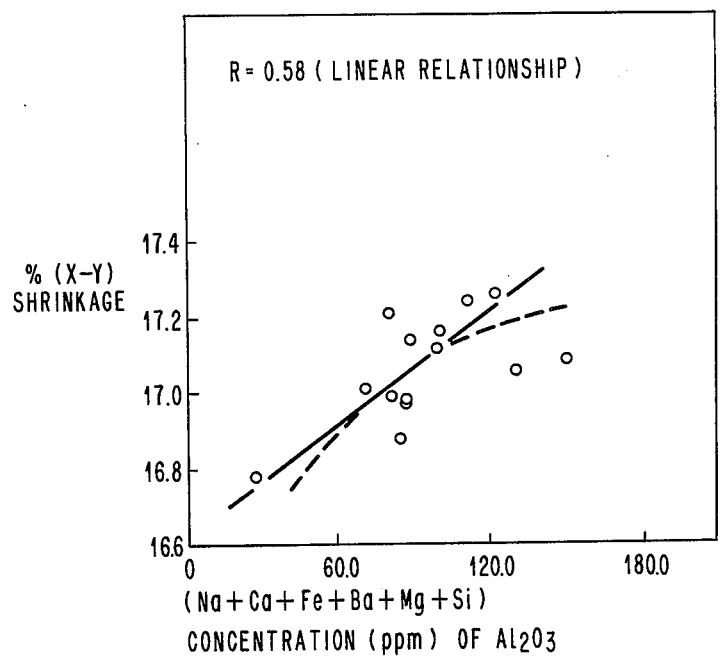
FIG. 4 IMPURITY CONCENTRATIONS vs. (X-Y) SHRINKAGE.
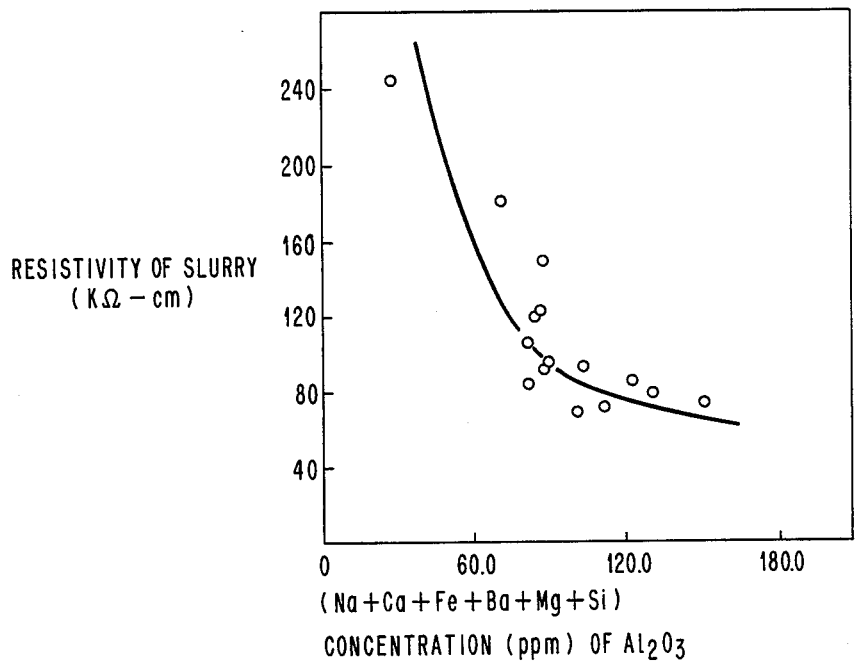
FIG. 5 IMPURITY CONCENTRATIONS vs. SLURRY RESISTIVITY.

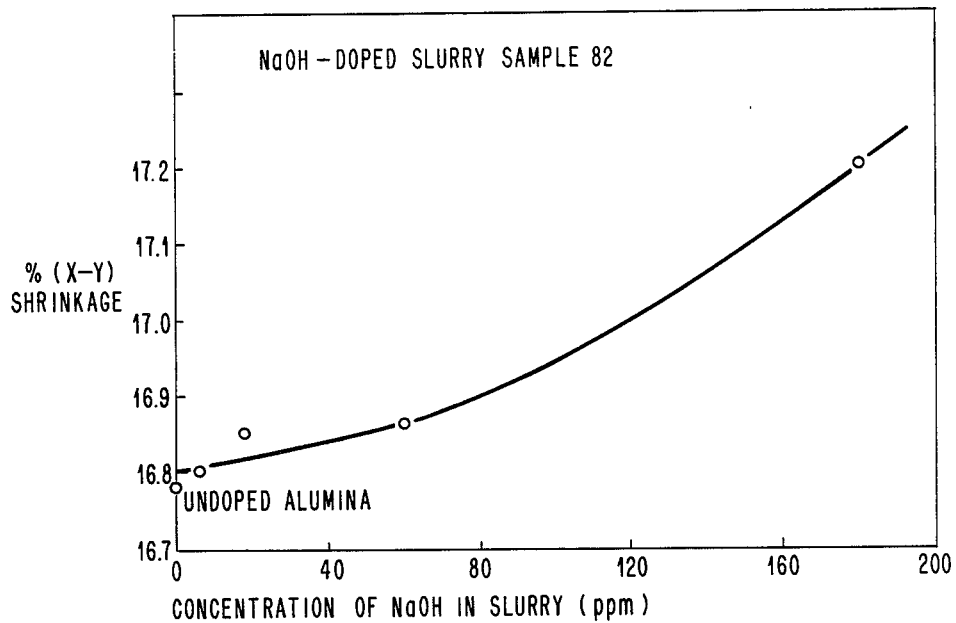
FIG. 6  NaOH CONCENTRATION vs. % (X-Y) SHRINKAGE.
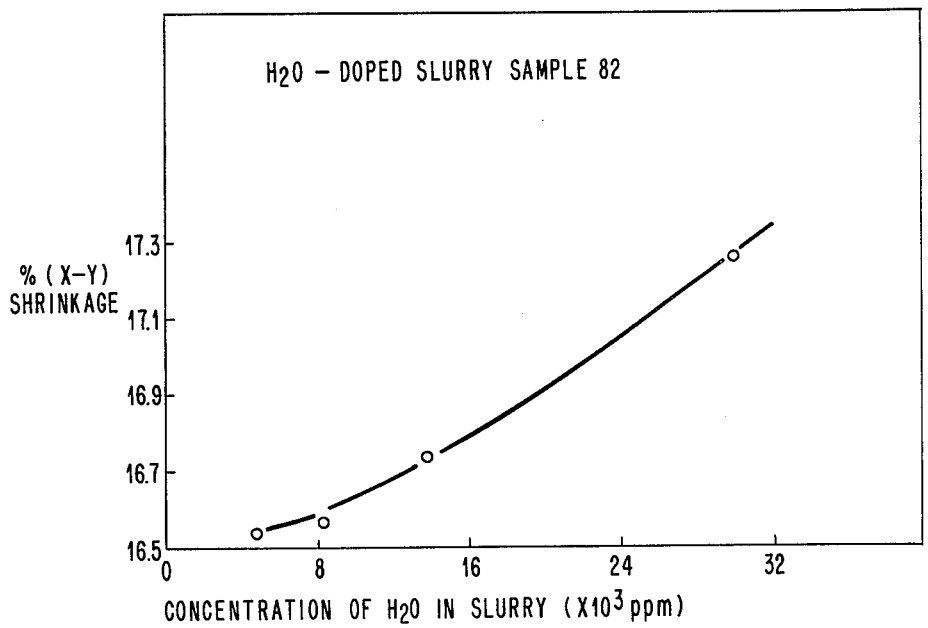
FIG. 7  H$_2$O CONCENTRATION vs % (X-Y) SHRINKAGE.

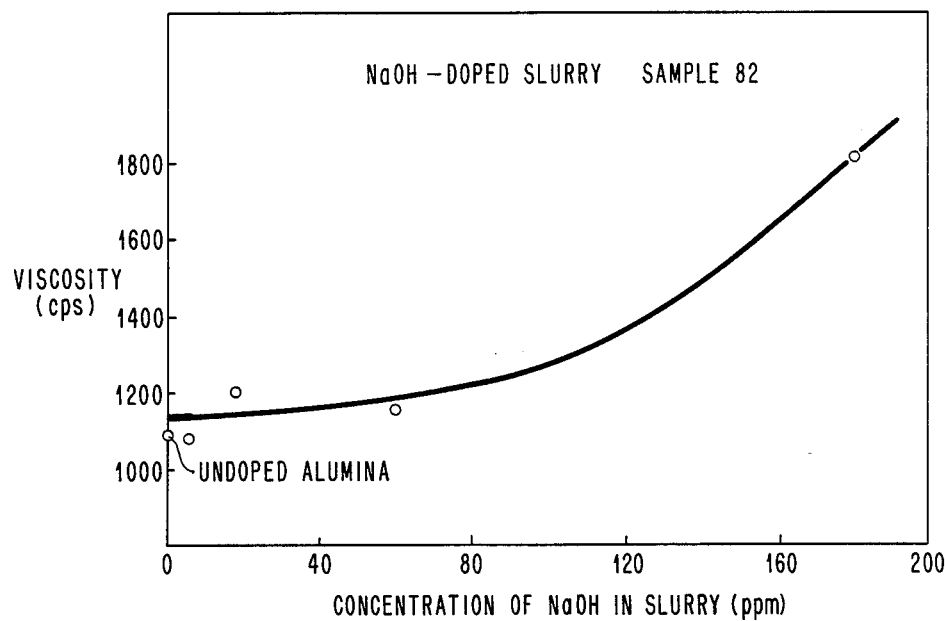
FIG. 8 NaOH CONCENTRATION vs. SLURRY VISCOSITY.
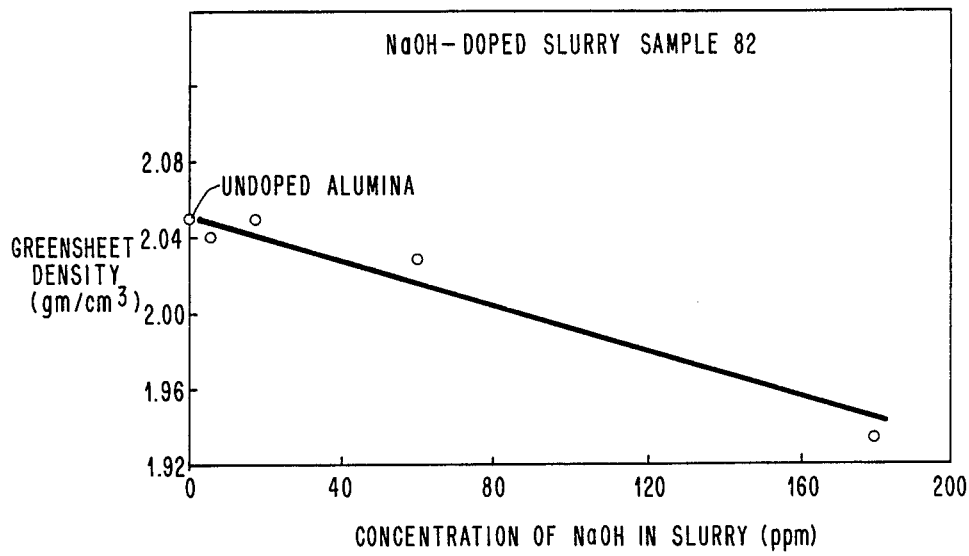
FIG. 9 NaOH CONCENTRATION vs. GREEN SHEET DENSITY

METHODS FOR PREDICTING AND CONTROLLING THE SHRINKAGE OF CERAMIC OXIDES DURING SINTERING

This is a continuation of application Ser. No. 851,019 filed Apr. 14, 1986, now abandoned, which is a continuation of application Ser. No. 521,463 filed Aug. 8, 1983, now abandoned.

BACKGROUND OF THE INVENTION

1. Field of the Invention

The present invention relates to methods for predicting and controlling the shrinkage of ceramic oxides during firing.

2. Description of the Prior Art

A relatively recent innovation in electronic packaging has been the development of the multilayer ceramic (hereinafter MLC) module. In this technology "green" sheets of ceramic powder held together by a temporary organic binder are metallized with a noble or refractory metal, usually, but not mandatorily, by screen printing. The metallized sheets are stacked, laminated and fired to form a monolithic ceramic-metal package. Details on MLC technology are given in SOLID STATE TECHNOLOGY, May 1972, Vol. 15, No. 5, pages 35-40, Kaiser et al, hereby incorporated by reference.

U.S. Pat. No. 4,052,538, Eddy et al, discloses a method of forming sintered sodium beta-alumina articles by forming an aqueous acidic colloidal solution (sol) of a dispersable alpha-alumina mono-hydrate, adding an aqueous solution of an inorganic oxygen-containing sodium salt to the sol to form a thixotropic gel, spray drying to form a free flowing powder, pressing into an article, heating to drive off volatile material and then sintering to form a densified sodium beta-alumina structure.

U.S. Pat. No. 4,265,669, Starling et al, discloses a hard, strong ceramic body, a ceramic raw batch and a method for manufacture. The body, after being formed of the raw batch, can be fired to a monolithic structure without any shrinkage or distortion during the firing operation. The raw batch contains aluminum oxide, magnesium oxide, glass frit and a silicone resin.

U.S. Pat. No. 4,316,965, Oda et al, discloses low expansion ceramics and methods of producing the same. These ceramics comprise defined proportions of $MgO$, $Al_2O_3$, $TiO_2$, $SiO_2$ and $Fe_2O_3$. The major component of the crystalline phase is a solid solution of magnesium oxide-aluminum oxide-titanium dioxide-silicon oxide-iron oxide. The method comprises preparing a batch, plasticizing the batch if necessary, shaping, drying and firing at a defined temperature. The resulting products have a honeycomb structure.

SUMMARY OF THE INVENTION

The fired shrinkage of a ceramic oxide can be predicted by measuring the ionic impurity concentration thereof.

If the ionic impurity concentration is such as to provide unacceptable shrinkage of the ceramic oxide, an ionic doping material can be added thereto to appropriately control the shrinkage during firing.

One object of the present invention is to provide a method of predicting the shrinkage of a ceramic oxide upon sintering.

Another object of the present invention is to provide a method of predicting the shrinkage of a ceramic oxide-containing green sheet upon sintering.

Yet another object of the present invention is to provide a method of predicting the shrinkage of a stack of ceramic oxide-containing green sheets which are to form an MLC upon sintering.

Still yet another object of the present invention is to provide a method of controlling the shrinkage of a ceramic oxide, a ceramic oxide-containing green sheet, or a stack of ceramic oxide-containing green sheets during sintering by adding appropriately controlled amounts of an ionic dopant thereto.

BRIEF DESCRIPTION OF THE DRAWINGS

FIG. 1 is a plot of electrophoretic mobility ($10^{-7}$ $cm^2$ $Volt^{-1}$ $Sec^{-1}$) vs. % (X-Y) green sheet shrinkage upon firing for the system of Example 1.

FIG. 2 is a plot of zeta potential (volt) vs. % (X-Y) green sheet shrinkage upon firing for the system of Example 1.

FIG. 4 is a plot of impurity concentration (ppm) vs. % (X-Y) green sheet shrinkage upon firing.

FIG. 5 is a plot of impurity concentration (ppm) vs. slurry resistivity ($K\Omega$-cm).

FIG. 6 is a plot of NaOH concentration (ppm) vs. % (X-Y) green sheet shrinkage upon firing for the system of Example 3.

FIG. 7 is a plot of $H_2O$ concentration (X $10^3$ ppm) vs. % (X-Y) green sheet shrinkage upon firing for the system of Example 4.

FIG. 8 is a plot of slurry viscosity (cps) vs. NaOH concentration (ppm).

FIG. 9 is a plot of green sheet density ($gm/cm^3$) vs. NaOH concentration (ppm).

DESCRIPTION OF PREFERRED EMBODIMENTS OF THE INVENTION

Figure 3:
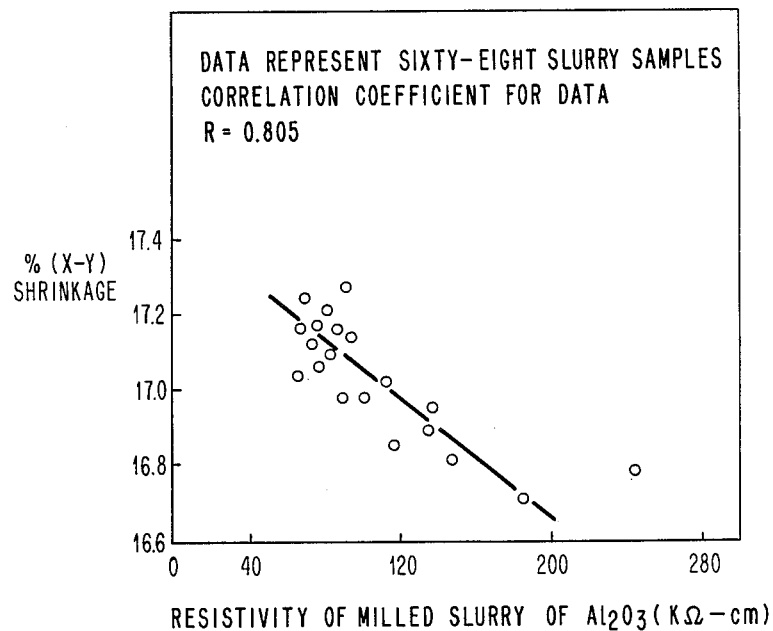
FIG. 3 is a plot of slurry resistivity ($K\Omega$-cm) vs. % (X-Y) green sheet shrinkage upon firing for the system of Example 2.

Prior to turning to the methods of predicting and controlling shrinkage of a ceramic oxide during sintering thereof, Applicants initially discuss background aspects of the present invention. It is to be understood that the background aspects of the present invention represent conventional prior art and it is the method of predicting and controlling shrinkage of the ceramic oxide during sintering which is novel for the present invention. Accordingly, these background aspects of the present invention are not to be construed as limitative.

The Ceramic Oxide

The ceramic oxide selected for use in the present invention is not unduly limited and can be freely selected from ceramic oxide materials as have been used in the prior art to yield a dense structure upon sintering, typically in green sheet form. The present invention is of application to any of such materials which show varying ionic impurity characteristics which affect shrinkage during sintering.

Most typically, however, the ceramic oxide will be α-alumina ($Al_2O_3$) as is conventionally used in the art, and most generally the same is used in combination with small proportions of a silicate frit, generally a combination of calcium, magnesium and aluminum silicate in proportions up to about 10 wt. % of the total of the ceramic oxide and silicate frit. Since the proportion of frit particles is typically very small, almost always on the order of 10 wt. % based on the $Al_2O_3$ particles or less, their effect on the method of the present invention is not overly important and, for practical purposes, the effect of frit particles, where present, can be ignored. The frit particles have a particle size as conventionally used in the art, which is essentially the same as the $Al_2O_3$ particles.

Since the present invention finds particular application in the case that the ceramic oxide is $Al_2O_3$, the following discussion will be in terms of $Al_2O_3$.

The size of the $Al_2O_3$ particles used for the present invention is not overly important and is selected from those sizes as are conventionally used in the art. Typically, this is on the order of from about 2 $\mu$m to about 8 $\mu$m, but this size range can be free adjusted by conventional procedures such as ball or vibro-milling, if desired or necessary.

While the present invention can be used to predict and control the shrinkage of ceramic oxides during sintering in general, the present invention does find particular application in predicting and controlling the shrinkage of ceramic oxide containing green sheets during sintering, most especially stacked ceramic oxide containing green sheets which are to form an MLC as described in SOLID STATE TECHNOLOGY, earlier mentioned, and hereafter the following discussion will be in the context of such ceramic oxide containing green sheets, more particularly $Al_2O_3$ containing green sheets.

The Polymeric Binder

As is well known in the art, $Al_2O_3$ green sheets are formed of $Al_2O_3$ in combination with a polymeric binder as mandatory components. The polymeric binders used can be freely selected from those used in the prior art.

The primary characteristics which the polymeric binder exhibits is that it be thermoplastic (softened at elevated temperatures), be flexible (typically it contains a plasticizer), be soluble in the volatile solvents typically used to cast the same onto a support for green sheet formation, and that it can be sintered off without leaving any substantial amount of residue during the green sheet sintering cycle.

Typical polymeric binders as are used in the art include acetals such as polyvinyl butyral, often with dioctyl phthalate or dibutyl phthalate as a plasticizer, polysaccharides such as guar gum, typically with glycerol as a plasticizer, polyamides, polyvinyl alcohols, polyacetates, polyvinyl chloride, etc.

Currently preferred polymeric binders are later discussed.

As will be appreciated by one skilled in the art, conventional additives as are used to form ceramic oxide containing green sheets can be used in accordance with the present invention.

Solvent

The slurry which is utilized to form a ceramic oxide-containing green sheet (hereafter often merely "green sheet") is typically formed using a solvent(s). The solvent(s) may be freely selected from those as are conventionally used in the prior art with the caveat that the same should be in relatively pure form or should preferably contain a known amount of known impurities. If desired, a mixture of different solvents boiling in the range of about 60° C. to 160° C. may be used. Useful solvents include aliphatic alcohols, ketones, aromatic solvents, compatible mixtures thereof, etc., for example, methanol, cyclohexanone, toluene, etc. A currently preferred solvent system is later described.

Slurry Proportions

The slurry which is utilized to form the green sheet of the present invention contains proportions of the desired components as are conventional in the art.

While by no means limitative, typically such a slurry will comprise from about 55 to about 70 wt. % $Al_2O_3$ particles, from about 5 to about 8 wt. % polymeric binder and from about 25 to about 40 wt. % solvent(s), basis being slurry weight.

Green Sheet Formation

The ceramic oxides which have been subjected to the methods of the present invention are used to form a green sheet in a conventional manner. Reference should be made to SOLID STATE TECHNOLOGY, earlier incorporated by reference and to U.S. Pat. No. 4,237,606 Niwa et al, also hereby incorporated by reference, for disclosure regarding the same.

Having thus described background prior art regarding the present invention, Applicants turn to the methods of the present invention in detail.

In many applications where green sheets are fired the fired shrinkage of the green sheets must be controlled, but this is particularly important in MLC manufacture where extremely tight control is necessary, e.g., 17.2±Ca. 0.3%. Most preferred degrees of (X-Y) % shrinkage are 16.86 to 17.54%. The $Al_2O_3$ that is typically used to produce such an MLC is most commonly manufactured by digesting bauxite ore with non-reagent grade sodium hydroxide and removing insoluble impurities by filtration, whereafter the $Al_2O_3$ is produced by calcining monoclinic alumina trihydrate from the standard Bayer process in a rotary kiln. Since the bauxite ore comes from varying sources, typically the resulting $Al_2O_3$ as received from the manufacturer contains varying amounts of impurities from lot to lot, e.g., $Na_2O$, CaO, BaO, MgO, etc., most especially $Na_2O$. The impurities can be leached from the $Al_2O_3$, potentially along with any impurities present in the polymeric binder, by the solvent.

While our data indicate ionic impurities can also be introduced from the binder, solvent and frit used, our resistivity and chemical analysis data indicate that ionic impurity contamination appears to be fairly consistent from lot to lot, and, accordingly, ionic impurities introduced from these constituents do not appear to be an overly important variable in effecting shrinkage upon green sheet firing.

We have found that varying amounts of impurities greatly affect the degree of shrinkage of the green sheet during sintering, which is typically at a temperature within the range of about 1350° to about 1650° C. for about 16 to about 24 hours (at peak temperature for about 1 hour) in an atmosphere such as wet hydrogen. For example, a high level of ionic impurities leads to a high shrinkage whereas a low level of ionic impurities leads to lower shrinkage.

We have found that ionic impurity concentration measurements provide a high correlation with green sheet shrinkage during sintering and that by conducting such ionic impurity measurements prior to sintering, the degree of shrinkage can be accurately predicted.

In addition, since the ionic impurity concentration controls shrinkage during firing, we have found that $Al_2O_3$ which exhibits too low a shrinkage during sintering can be modified to exhibit the desired degree of shrinkage by adding an appropriate amount of an ionic doping material. For example, the level of ionic impurities in "undoped" $Al_2O_3$ is determined by one of the methods discussed herein and then an appropriate amount of NaOH (or water) is added to the slurry during slurry dispersion to bring the charge density or ionic impurity concentration level to the desired level.

If desired, the NaOH can be dissolved in a small amount of the polymeric binder or methanol and added to the slurry, insuring, of course, adequate mixing.

To illustrate the effect of ionic impurity concentration on % X-Y shrinkage during sintering and upon resistivity, FIGS. 4 and 5 present, respectively, a plot of ionic impurity concentration (ppm) vs. % (X-Y) shrinkage upon firing and slurry resistivity (KΩ-cm).

Ionic impurity concentration measurements can be made by various conventional techniques as will now be described.

Since the present invention finds particular application with an $Al_2O_3$/frit/polymeric binder/solvent slurry, the following discussion will be in the context of such a slurry. As earlier indicated, however, the present invention is not limited thereto.

In addition, for purposes of more specifically illustrating the present invention and to provide a reference point so that all data are with reference to the same general type of slurry, the following more detailed discussion and examples will be with reference to a slurry composed of 58.56% α-$Al_2O_3$, 7.24% of a frit of calcium, magnesium and aluminum silicates, and 34.2% of an organic phase comprising dipropylene glycol dibenzolate, a commercially available polymeric binder Butvar (B-98) which is a polyvinyl butyral resin comprising approximately 80 mol % polyvinyl acetal, 18 to 20 mol % polyvinyl alcohol and 0 to 2.5 mol % polyvinyl acetate, and methanol, all organics being present in conventional amounts as earlier indicated. The ionic impurity concentration of such a slurry can be conducted by conventional techniques such as chemical analysis, resistivity measurements or other techniques as will now be discussed.

Such ionic impurity concentrations can be determined using conventional apparatus. In the following discussion an Electrophoretic Mass Transport Analyzer (Model 1202) equipped with an ohm meter receptacle, manufactured by Micromeritics Instrument Corporation, Norcoss, Ga., was used. It was equipped with a standard platinum conductivity/resistivity cell manufactured by Beckmann, Inc. The cell consisted of two platinum electrodes encased in a glass cylinder with two ends of the electrodes exposed for making contact with the slurry to be analyzed. The other end of the cell had an electrical receptacle for attachment to the Mass Transport Analyzer.

Initially the cell constant was determined using a standard KCl solution (0.01N) using the following equation to calculate the cell constant.

$$K_c = (R_c)(\lambda_{KCl}) = (\text{ohm})(\text{ohm}^{-1}\text{-cm}^{-1}) = \text{cm}^{-1}$$

where
$R_c$ = measured resistance of KCl solution.
$\lambda_{KCl}$ = specific conductance from the literature.

Thus, the resistance of the slurry divided by the cell constant for a particular temperature is the slurry resistivity, i.e.:

$$\text{Slurry resistivity} = \frac{\text{Resistance (ohms)}}{\text{Cell Constant (cm}^{-1})} = \text{ohm-cm}$$

The resistance and subsequent resistivity of each slurry sample was determined at room temperature and immediately afterward the particle mobility of the slurry sample was measured using the Mass Transport Analyzer; the results were used to calculate the electrophoretic mobility and zeta potential of the samples using the following equations:

$$\phi = \frac{(\text{wt. fraction dispersed solids}/\rho_p)}{(\text{wt. fract. dispersed solids}/\rho_p) + (\text{wt. fract. liquids}/\rho_l)}$$

where,
$\rho_p$ = Density of α-$Al_2O_3$/frit mixture
$\rho_l$ = Density of total organic system
$\phi$ = Volume fraction of solids $$V_\epsilon = \frac{(\Delta W)(K_c)}{(R_c)(\tau)(I)(\phi)(1-\phi)(\rho_p - \rho_l)} = 10^{-7} \text{ CM}^2 \text{ Sec}^{-1} \text{ volt}^{-1}$$

where,
ΔW = Weight change in sample cell (Teflon material)
τ = Time of test
I = Current
$R_c$ = Resistance of slurry sample
$K_c$ = Conductivity cell constant
$V_\epsilon$ = Electrophoretic mobility $$\zeta = (-)\frac{(36 \times 10^4)(\pi)(V_\epsilon)(\eta)}{D} = \text{volt} \quad \text{(C)}$$

where,
η = Viscosity of total organic system
D = Dielectric constant of total organic system
ζ = Zeta potential The dielectric constant, D, of the total organic system was determined from the individual dielectric constants of the ingredients which make up the organic system. Such are typically available in the literature or may be determined in a conventional fashion. The following logarithmic-mixture rule equation for solvent mixtures was used to calculate the dielectric constant of the organic system at room temperature.

$$\text{Log } D = \sum_i V_i \text{ Log } D_i - \text{Dimensionless} \quad \text{(D)}$$

where,
$V_i$ = Volume fraction of phase i
$D_i$ = Dielectric constant of phase i By any of the above procedures, the ionic impurity concentration of slurries containing $Al_2O_3$ from different lots can be determined and a plot generated which correlates ionic impurity concentration with shrinkage of the corresponding green sheet during firing, as will later be exemplified in detail.

As will be apparent from the above discussion, certain slurries formed using $Al_2O_3$ with a very low impurity content will show very low shrinkage. In accordance with another embodiment of the present invention, the slurry is doped with an ionic electrolyte to increase the ionic impurity concentration. With this known increased ionic impurity concentration, with the graphical data as earlier mentioned one can predict the degree of shrinkage during sintering for the modified slurry.

As one skilled in the art will appreciate, the ionic electrolyte will most typically be based upon one of the cationic constituents of the impurities as are present in the $Al_2O_3$, most typically Na, Ca, Ba, Mg, etc., but since Na appears to be the ionic impurity which exhibits the greatest effect on slurry shrinkage during sintering, most typically the ionic electrolyte used will be NaOH. Water can also be used as later exemplified.

Since most typical ionic impurities as are present in $Al_2O_3$ are present in an amount on the order of about 0.06 ppm to about 130 ppm, usually any ionic electrolyte will be added in an amount sufficient to bring the total concentration of ionic impurities in the slurry to this range, though this is not limitative so long as shrinkage requirements are met.

As will be appreciated by one skilled in the art, the method of the present invention can also be used to screen unacceptable lots of alumina from acceptable lots of alumina. For such analysis typically a "model" slurry is merely formed by blending all components for about 15 minutes, permitting bubbles or froth in the slurry to break, allowing the slurry to come to room temperature and then generally performing the above zeta potential or resistivity measurement, most preferably the resistivity measurement, to thereby obtain the predicted shrinkage upon sintering.

Having thus generally described the present invention, the following working examples are offered to illustrate the same with reference to the Figures.

EXAMPLE 1

This example illustrates the determination of zeta potential to permit one to predict the shrinkage of a green sheet upon sintering. Slurry proportions were as earlier given. The slurry was simply formed by mixing all ingredients and then ball milling the same in a conventional manner for 16 hours to an average particle size of about 3 microns.

Thereafter, electrophoretic mobility and zeta potential measurements were conducted using the Electrophoretic Mass Transport Analyzer as earlier explained. The determined electrophoretic mobility of the slurry vs. % (X-Y) shrinkage upon green sheet sintering is shown in FIG. 1.

As can be seen, as the electrophoretic mobility and the zeta potential of the $Al_2O_3$ and frit particles in the slurry increase, the shrinkage of a corresponding substrate increased.

The results obtained upon analyzing 30 slurries are given in FIG. 2. In FIG. 2, a less negative zeta potential for the milled slurry (volts) represents a lower ionic impurity concentration whereas a more negative zeta potential of the milled slurry (volts) represents a higher ionic impurity concentration. As can easily be seen, zeta potential, and accordingly ionic impurity concentration, correlate very well with green sheet shrinkage upon sintering.

The actual analysis procedure involved simply taking a small sample of the well-milled slurry (about 150 cm³), de-airing, redispersing, permitting the same to reach room temperature and then determining electrophoretic particle mobility using the Electrophoretic Mass Transport Analyzer (insuring no bubbles were on the electrodes) and from these results calculating the charge density or zeta potential of the slurry particles in terms of volts using the earlier provided equations.

The conductivity cell should be cleaned after use in an appropriate solvent such as methyl alcohol until residual slurry has been removed and then blown dry with dry nitrogen.

In all instances following green sheet formation the green sheet was sintered at a temperature of 1350° to 1650° C. for 24 hours and was at peak temperature for about 1 hour in a wet hydrogen atmosphere at one atmosphere in a conventional fashion. Unless otherwise indicated, percent shrinkage was determined in the following examples at the same conditions.

As can also be seen, the correlation coefficient (R factor) shows that the relationships between electrophoretic mobility and zeta potential and shrinkage are quite good.

EXAMPLE 2

This example illustrates the use of slurry resistivity measurements to predict the shrinkage of a green sheet upon sintering.

We have found that slurry resistivity measurements are a more accurate indication of shrinkage than other measurements as we believe slurry resistivity measurements to be a more accurate measure of the total electrical contribution of the ionic constituents in the slurry. Further, slurry resistivity measurements are quite easy to make.

The slurries used in this example were formed as described for Example 1.

Slurry resistivity measurements were performed as follows.

Using the Electrophoretic Mass Transport Analyzer earlier described, slurry samples were de-aired, each sample being approximately 150 cm³ in volume. The samples were allowed to cool to room temperature and redispersed by shaking for several minutes before measuring resistivity. Slurry sample resistivity was obtained by immersing the conductivity/resistivity cell about an inch into the slurry, insuring that both platinum electrodes were completely submerged in the slurry, and then the cell was agitated back and forth in the slurry to remove trapped air bubbles from the electrodes which would affect resistivity values.

Resistivity measurement was then conducted by rotating a resistant potentiometer in the proper direction until a balance was approached, as indicated by minimum deflection on the ammeter. At this point the resistance of the slurry sample is given, and its resistivity is calculated by dividing slurry resistance by the conductivity cell constant in accordance with the earlier provided formula.

The results obtained are shown in FIG. 3. As is easily seen there is an excellent correlation between resistivity and green sheet shrinkage on sintering, i.e., there is an excellent correlation between ionic impurity concentration and green sheet shrinkage upon sintering.

The R factor exhibited by FIG. 3 is seen to be exceptionally good, confirming our view that slurry resistivity measurements show a better correlation with shrinkage than other measurements.

Following essentially the same procedure as above, Sample 101, which had a high Na level of 104 ppm, gave a high shrinkage of 17.2%, whereas a Sample 82, which had a low level of Na of 22 ppm, gave a low shrinkage of 16.78%, Na levels being confirmed by inductively coupled argon plasma spectroscopy. There were virtually no differences between the surface areas of the two $Al_2O_3$ samples used to form the slurries, viz: Sample 101: 0.976 $m^2/g$; Sample 82: 0.932 $m^2/g$. Additional slurries were formed following the above procedure. Sample 16, which was very similar to Sample 82, exhibited a slurry resistivity of 186 K$\Omega$-cm as compared with a slurry resistivity of 88 K$\Omega$-cm using Sample 98, which was very similar to Sample 101. The zeta potentials of the two slurries were −0.08 volt and −0.28 volt, respectively. Sample 16 yielded a shrinkage of 16.76% whereas Sample 98 yielded a shrinkage of 17.20%.

Resistivity, surface area values for $Al_2O_3$, percent shrinkage of the green sheet upon firing and sodium content for two of the above Samples and other Samples were determined and are given below. Within experimental error, the excellent correlation between sodium content and percent shrinkage on firing is easily seen.

TABLE

Resistivity and surface Area Comparison with % Shrinkage For $Al_2O_3$ Slurries

| Sample No. | Resistivity (K$\Omega$-cm) | Surface Area $m^2/gm$ | % Shrinkage | Sodium Content (p.p.m.) |
|---|---|---|---|---|
| 82 | 198 | 0.9319 | 16.78 | 22.3 |
| 123 | 170 | 0.9636 | 16.80 | 44.6 |
| 110 | 159 | 0.9827 | 16.85 | 55.1 |
| 116 | 125 | 0.9717 | 17.01 | 39.4 |
| 109 | 121 | 0.9612 | 16.99 | 52.1 |
| 128 | 120 | 0.9643 | 17.02 | 45.2 |
| 145 | 120 | 0.9741 | 17.14 | 63.0 |
| 209 | 116 | 0.8781 | 16.96 | 71.4 |
| 92 | 108 | 0.9576 | 16.98 | 65.7 |
| 150 | 93.6 | 1.0039 | 17.32 | 81.5 |
| 101 | 85.0 | 0.9762 | 17.26 | 103.7 |
| 185 | 84.0 | 0.9058 | 17.23 | 101.6 |
| 130 | 83.9 | 0.9916 | 17.03 | 42.9 |
| 176 | 79.0 | 0.9344 | 17.06 | — |
| 103 | 71.0 | 0.9862 | 17.24 | 88.3 |
| 134 | 69.4 | 0.9891 | 17.16 | 76.8 |

EXAMPLE 3

This Example illustrates the ionic electrolyte doping procedure of the present invention which enables one to achieve good green sheet density and shrinkage results.

In each instance, the slurry was formed as above described and sintering was conducted at the earlier indicated conditions. The $Al_2O_3$ was the same as that used in Sample 82.

Four different doping concentrations were used: 6, 18, 60 and 180 ppm of 98% reagent grade NaOH. Doping was performed by simply pouring dry powdered NaOH into the ball mill during the ball milling cycle. In this instance, the milling cycle was 6.5 hours for frit milling, whereafter the $Al_2O_3$ was added and milling was conducted for a further ten hours. After de-airing the resulting slurry, slurry samples were taken for zeta potential resistivity measurements.

The results obtained are presented in FIG. 6 where the amount of added NaOH is plotted against % (X-Y) shrinkage. It is easily seen that increasing amounts of NaOH increase shrinkage, permitting shrinkage to be controlled in a highly accurate fashion.

EXAMPLE 4

The procedure of Example 3 was followed except that the NaOH was replaced by water to effect water doping of the slurry. It had been found that regular tap water was extremely soluble in the total organic phase of the slurry. Water concentrations of 2.8, 8.3, 13.9 and 30 (X $10^3$ ppm) were used. All other procedures were the same.

The results obtained are shown in FIG. 7; again, an excellent correlation is seen between water concentration and the slurry and % (X-Y) shrinkage.

Several other interesting effects were noted with respect to the doping procedure of Examples 3 and 4.

With increasing amounts of NaOH or water, a general trend was noted that slurry viscosity increased, whereas a general trend was noted that green sheet density decreased. As would be expected, the zeta potential of the slurry was found to increase with increasing concentrations of NaOH and water, reflected by increased % (X-Y) shrinkage. Finally, as would be expected, slurry resistivity was found to generally increase with increasing amounts of NaOH and water, with a corresponding decrease in % (X-Y) shrinkage. It should be noted that $H_2O$-doped material does not easily strip from a Mylar ® carrier at high casting speeds and, accordingly, it may be necessary to use lower casting speeds.

In fact, slurry viscosity is virtually directly proportional to the NaOH and $H_2O$ concentrations ranging from about 1150 cps for undoped $Al_2O_3$ to about 1800 cps at about 180 ppm NaOH and from about 625 cps at $3 \times 10^3$ ppm $H_2O$ to about 1100 cps at $32 \times 10^3$ ppm $H_2O$, indicating that slurry viscosity can be varied or controlled at will by doping the slurry with suitable ionic electrolytes. Slurry viscosity (cps) is plotted vs. NaOH concentration (ppm) for the slurry formed from Sample 82 in FIG. 8.

Our data also indicate that green sheet density is also virtually linear with respect to the NaOH and $H_2O$ concentration in the slurry (all green sheet densities are $gm/cm^3$) ranging from about 2.04 for undoped $Al_2O_3$ down to 1.96 at 180 ppm NaOH and from about 2.18 at about $2 \times 10^3$ ppm $H_2O$ down to about 1.75 at about $30 \times 10^3$ ppm $H_2O$. Green sheet density ($g/cm^2$) is plotted vs. NaOH concentration for the slurry formed from Sample 82 in FIG. 9.

In all of the above instances, the $Al_2O_3$ in the slurry was the same as that given for Sample 82.

Thus, it can be seen that ionic electrolytes can be used to substantially affect green sheet density.

While there have been described what are at present considered to be the preferred embodiments of this invention, it will be obvious to those skilled in the art that various changes and modifications can be made therein without departing from the invention, and it is, therefore, intended to cover all such changes and modifications as fall within the true spirit and scope of the invention.

What is claimed is:

1. A method of controlling the fired shrinkage of a ceramic oxide slurry which comprises:
   (a) measuring the ionic impurity concentration in a ceramic oxide slurry which consists essentially of a ceramic oxide, a polymeric binder, an organic solvent and no more than about 10 wt% of a silicate frit based on the total weight of ceramic oxide and silicate frit and
   (b) adding to the slurry at least one ionic dopant in an amount which, when added to the measured ionic impurity concentration, provides a total concentration of ionic impurities in the slurry of about 0.06 ppm to about 180 ppm and which produces the total ionic impurity concentration required to obtain a desired fired shrinkage, wherein said amount of ionic dopant added to the slurry is determined by comparing the ionic impurity concentration in the starting slurry to a plot of known ionic impurity concentration versus shrinkage during firing.

2. The method of claim 1 wherein said ionic dopant is selected from the group consisting of sodium hydroxide and water.

3. The method of claim 1, wherein the dopant is added in an amount to provide a (X-Y)% shrinkage of 17.2± about 0.3%.

4. The method of claim 1, wherein the dopant is added in an amount to provide a (X-Y)% shrinkage of from about 16.86 to about 17.54%.

5. The method of claim 1, wherein the dopant is $H_2O$ and is added in an amount to provide an $H_2O$ concentration of from about 8,300 ppm to about 30,000 ppm.

6. The method of claim 1, wherein the solvent is methanol, cyclohexanone or toluene.

7. The method of claim 1, wherein the solvent is an aliphatic alcohol.

8. The method of claim 1, wherein the solvent is a ketone.

9. The method of claim 1, wherein the solvent is aromatic.

10. The method of claim 1, wherein said ceramic oxide slurry consists essentially of about 55 to about 70 wt% $Al_2O_3$ particles, from about 5 to about 8 wt% polymeric binder, from about 25 to about 40 wt% solvent, basis being slurry weight, and no more than about 10 wt% of a silicate frit based on the total weight of the $Al_2O_3$ silicate frit.

11. The method of claim 1, wherein the fired shrinkage results from sintering at a temperature within the range of about 1350° to about 1650° C. for about 16 to about 24 hours.

12. The method of claim 1 wherein said measuring the ionic impurity concentration is based upon slurry electrical resistivity.

13. The method of claim 12 wherein the dopant is $H_2O$ and is added in an amount to provide an $H_2O$ concentration of from about 8,300 ppm to about 30,000 ppm.

14. The method of claim 1, wherein the dopant is NaOH.

15. The method of claim 14 wherein the NaOH is added in an amount to provide an NaOH concentration of about 60 ppm to about 180 ppm.

16. The method of claim 15, wherein said ceramic oxide is $Al_2O_3$.

17. The method of claim 16, wherein said ceramic oxide slurry consists essentially of about 55 to about 70 wt% $Al_2O_3$ particles, from about 5 to about 8 wt% polymeric binder, from about 25 to about 40 wt% solvent, basis being slurry weight, and no more than about 10 wt% of a silicate frit based on the total weight of the $Al_2O_3$ and the silicate frit.

18. The method of claim 16 wherein the NaOH is added in an amount to provide a (X-Y%) shrinkage of from about 16.8 to about 17.5%.

* * * * *